(12) United States Patent
Strehle et al.

(10) Patent No.: US 10,576,953 B2
(45) Date of Patent: Mar. 3, 2020

(54) ELECTRONICALLY SLIP-CONTROLLABLE BRAKING SYSTEM

(71) Applicant: Robert Bosch GmbH, Stuttgart (DE)

(72) Inventors: Alfred Strehle, Fellbach (DE); Marko Flinner, Boxberg-Bobstadt (DE); Matthias Schanzenbach, Eberstadt (DE); Thomas Schmidt, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/807,879

(22) Filed: Nov. 9, 2017

(65) Prior Publication Data

US 2018/0148025 A1 May 31, 2018

(30) Foreign Application Priority Data

Nov. 30, 2016 (DE) .......................... 10 2016 223 728

(51) Int. Cl.
*B60T 8/1766* (2006.01)
*B60T 8/34* (2006.01)
(Continued)

(52) U.S. Cl.
CPC ............ *B60T 8/1766* (2013.01); *B60T 7/042* (2013.01); *B60T 8/1755* (2013.01); *B60T 8/34* (2013.01);
(Continued)

(58) Field of Classification Search
CPC .......... B60T 8/1766; B60T 8/344; B60T 8/34; B60T 8/348; B60T 8/268; B60T 8/4077; B60T 8/4872; B60T 8/1755; B60T 13/745; B60T 7/042; B60T 2270/402; B60T 2270/403

See application file for complete search history.

(56) References Cited

U.S. PATENT DOCUMENTS 4,809,181 A * 2/1989 Ito ........................ B60T 8/1755
  303/146
5,127,713 A * 7/1992 Birkenbach ............... B60T 8/26
  303/113.1

(Continued)

FOREIGN PATENT DOCUMENTS

DE 102009001135 A1 8/2010

*Primary Examiner* — Melody M Burch
(74) *Attorney, Agent, or Firm* — Norton Rose Fulbright US LLP; Gerard Messina

(57) ABSTRACT

An electronically slip-controllable braking system including an actuatable master brake cylinder, to which at least one wheel brake, associated with a wheel of a front axle and at least one wheel brake, associated with a wheel of a rear axle of a vehicle, are connected. An electronically activatable first actuator system sets and regulates brake pressures different from one another in the wheel brakes as a function of the particular present slip conditions. An electronically activatable second actuator system effectuates the setting and regulating of a uniform brake pressure at the wheel brakes and a third actuator system limits the brake pressure generated by the second actuator system at the wheel brakes associated with the wheels of the rear axle. The third actuator system controls a second pressure medium connection between the associated wheel brake of the rear axle and a pressure medium storage container.

14 Claims, 2 Drawing Sheets

Figure 1:
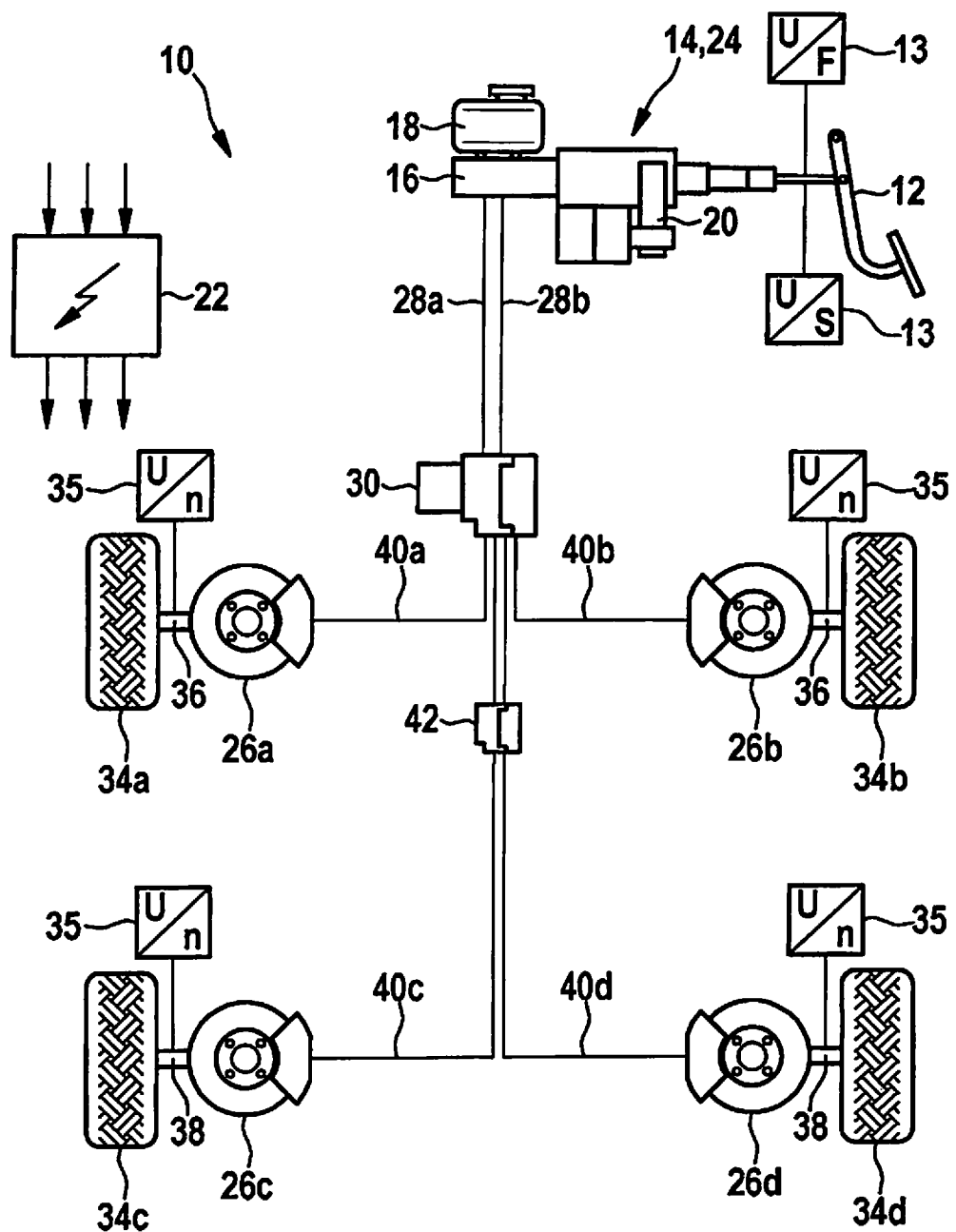

(51) Int. Cl.

| | |
|---|---|
| *B60T 8/1755* | (2006.01) |
| *B60T 7/04* | (2006.01) |
| *B60T 13/74* | (2006.01) |
| *B60T 8/40* | (2006.01) |
| *B60T 8/48* | (2006.01) |
| *B60T 13/68* | (2006.01) |
| *B60T 8/26* | (2006.01) |

(52) U.S. Cl.
CPC ............ *B60T 8/344* (2013.01); *B60T 8/4077* (2013.01); *B60T 8/4872* (2013.01); *B60T 13/686* (2013.01); *B60T 13/745* (2013.01); *B60T 8/268* (2013.01); *B60T 8/348* (2013.01); *B60T 2270/402* (2013.01); *B60T 2270/403* (2013.01)

(56) References Cited

U.S. PATENT DOCUMENTS

| | | | |
|---|---|---|---|
| 7,401,867 B2* | 7/2008 | Riddiford | B60T 8/885 |
| | | | 303/20 |
| 2002/0014379 A1* | 2/2002 | Oka | B60T 7/042 |
| | | | 188/151 R |
| 2007/0029876 A1* | 2/2007 | Makishima | B60T 7/22 |
| | | | 303/191 |
| 2007/0188014 A1* | 8/2007 | Sato | B60T 8/4059 |
| | | | 303/11 |
| 2009/0091180 A1* | 4/2009 | Iwasaki | B60T 8/171 |
| | | | 303/11 |

* cited by examiner

ELECTRONICALLY SLIP-CONTROLLABLE BRAKING SYSTEM

CROSS REFERENCE

The present application claims the benefit under 35 U.S.C. § 119 of German Patent Application No. DE 102016223728.4 filed on Nov. 30, 2016, which is expressly incorporated herein by reference in its entirety.

FIELD

The present invention is directed to an electronically slip-controllable braking system.

BACKGROUND INFORMATION

An electronically slip-controllable braking system for a motor vehicle described in German Patent Application No. DE 10 2009 001135 A1.

This conventional braking system includes a first actuator system, referred to hereafter as the primary actuator system, in the form of a conventional ABS/ESP braking system for wheel-individual modulation of the brake pressure as a function of the slip conditions prevailing at the wheels. The brake pressures of the individual wheel brakes are settable or controllable independently of one another by the first actuator system, because of which, in conjunction with a conventional four-wheel motor vehicle, this may also be referred to as a four-channel control actuator system. The braking system is equipped for this purpose, inter alia, with a hydraulic assembly, which includes a housing block equipped with pumps and valves and an electronic control unit, which controls these pumps and valves as a function of sensor signals, which represent the slip conditions at the individual wheels. A brake pressure buildup valve and a brake pressure reducing valve are associated with each wheel brake of the vehicle braking system for brake pressure control.

This primary actuator system allows the driving condition of a vehicle to be stabilized during a braking procedure, when starting, or during driving operation, by reducing the brake pressure at the wheel brakes at least until a possibly occurring wheel slip has assumed a controllable amount or no longer occurs at all. The brake pressure is generated by the primary actuator system and the driver jointly or independently of the driver. The primary actuator system may accordingly be operated in a so-called partially-active mode or in a fully-active mode.

Furthermore, the conventional vehicle braking system includes a second actuator system or secondary actuator system, for example, in the form of an electromechanical brake booster. This secondary actuator system is typically connected to the master brake cylinder and is used in normal operation for increasing the driving comfort, by assisting the driver when building up a brake pressure necessary for a braking procedure. An electromechanical brake booster includes for this purpose an electronically activatable actuator, which provides an external force for actuating a master brake cylinder. The actuation of the master brake cylinder may be carried out solely by the external force of the secondary actuator system or by a combination of this external force with a muscular strength provided by the driver.

First and second actuator systems or primary actuator system and secondary actuator system accordingly form two redundant systems for generating and modulating a brake pressure in a vehicle braking system, this brake pressure modulation being able to be carried out in each case with or without participation of the driver. The two actuator systems therefore fulfill an essential basic requirement for implementing and carrying out a partially-automated or fully-automated driving operation.

Because the driver only still exercises a checking or monitoring function during such an automated driving operation, particularly high requirements exist with respect to the reliability of such electronic pressure-controllable vehicle braking systems. These requirements are fulfilled by a corresponding provision of two redundant actuator systems.

However, the secondary actuator system, in contrast to the primary actuator system, is solely capable, by actuating the master brake cylinder, of indirectly supplying all wheel brakes connected thereto of the vehicle braking system with a uniform brake pressure or uniformly modulating this brake pressure. This functionality is referred to in professional circles as a one-channel control actuator system. Nonetheless, a secondary actuator system designed as one-channel is sufficient to decelerate a vehicle to a standstill while maintaining its directional stability in case of a malfunction of the primary actuator system.

Minimum requirements for longitudinal or directional stabilization of the vehicle are maintaining a locking sequence, i.e., a brake pressure buildup in such a way that the wheel brakes of the front axle reach their locking limit before the wheel brakes of the rear axle with respect to time, furthermore maintaining the steerability of the vehicle and thus ensuring a maximum locking time of the vehicle wheels and the option of an active or driver-independent buildup of a brake pressure.

In particular, the mentioned criterion of the locking time limiting of the wheels has the result that the maximum achievable deceleration values of the vehicle are dependent on the brake power which is convertible by the wheel brakes of the rear axle. This convertible brake power at the rear axle is comparatively low during a braking procedure due to the dynamic axle load displacement in the direction of the front axle which takes place for reasons of mass inertia. Since an axle load increase on the front axle is necessarily accompanied by an axle load reduction of the rear axle, its wheels tend to lock significantly earlier or at lower brake pressures than the front wheels, which are more strongly loaded in relation thereto. Locking of the rear wheels has to be counteracted by a corresponding reduction of the brake pressure on the wheel brakes of the rear axle if the driving stability of the vehicle is not to be endangered.

Due to the above described property of the secondary actuator system of being able to apply only a uniform brake pressure to all present wheel brakes, in combination with a low brake pressure convertible by the wheel brakes of the rear axle, without risk of locking of the associated wheels, in the case of a braking procedure in which the brake pressure is applied by the secondary actuator system as a result of an occurring malfunction at the primary actuator system, the disadvantage results that the resulting convertible total brake power of the vehicle is relatively low or consequently a relatively long braking distance of the vehicle results. This has a particularly negative effect in vehicles in which the resulting dynamic axle load displacement in the direction of the front axle during a braking procedure is particularly large, for example, as a result of a high vehicle center of gravity.

To avoid this disadvantage, equipping electronic pressure-controllable vehicle braking systems with a further actuator system, referred to hereafter as a third actuator system, is furthermore known.

This third actuator system is a further electronic controllable unit which is activated in case of fault of the primary actuator system and adapts the brake pressure provided by the secondary actuator system at the wheel brakes of the rear axle to the weight relief of the rear axle taking place during this braking procedure. Such a third actuator system may be fluidically connected between the primary actuator system and the secondary actuator system or may alternatively also be connected between the primary actuator system and the wheel brakes of the rear axle. It enables an electronic activation of the secondary actuator system in such a way that it provides a higher brake pressure, which is only convertible in its entirety into a brake pressure by the wheel brakes of the more strongly loaded front axle, by preventing a corresponding increase of the brake pressure at the wheel brakes of the rear axle if this brake pressure approaches a threshold value, from which the brake pressure is no longer convertible in its entirety into a braking power. The third actuator system accordingly cancels out the otherwise required limiting of the brake pressure level of the vehicle braking system to the lower brake pressure level which is still convertible by the wheel brakes of the rear axle and additionally enables the brake power transmittable by the wheel brakes of the front axle to be utilized in its entirety.

However, if the slip conditions on the wheel associated with the rear axle change during a braking procedure having activated third actuator system in the direction of a reduction of the friction values between wheel and roadway, an adaptation or reduction of the brake pressure at the wheel brake of the rear axle is necessary. Known third actuator systems have for this purpose a pressure medium store, in which pressure medium may be discharged from the wheel brake of the rear axle for brake pressure reduction. However, such pressure medium stores only have a limited accommodation volume and accordingly have to be emptied after multiple pressure reductions are carried out. During the duration of such an emptying of the pressure medium store, the explained function of the third actuator system is not available or the emptying procedure has to be terminated if necessary.

SUMMARY

In accordance with the present invention, a third actuator system controls, in addition to a first pressure medium connection between the second actuator system and the wheel brake of the rear axle, a second pressure medium connection which is formed between the wheel brake of the rear axle and a pressure medium storage container. This pressure medium storage container accommodates the pressure medium to be discharged from the wheel brake of the rear axle if needed. The pressure medium storage container is additionally incorporated to conduct pressure medium into the brake circuit, by being connected, for example, to a reservoir of the master brake cylinder of the braking system and therefore not requiring any intermittent or controlled emptying. The pressure medium discharged into the pressure medium storage container and thus removed from the brake circuit is supplemented again by tracking of the brake pedal and actuation of the master brake cylinder accompanying this. This pressure medium exchange is noticeable to the driver on the basis of the movement of the brake pedal, however, the third actuator system is continuously available.

By way of a possible connection of the third actuator system to a reservoir provided in the braking system in any case, separate pressure medium stores are saved and the number of components is reduced. Furthermore, costs, installation space, and assembly effort are saved.

Further advantages or advantageous refinements of the present invention result are described herein.

The second pressure medium connection advantageously connects the wheel brake of the rear axle directly to the pressure medium storage container. This permits unthrottled drainage of pressure medium into the pressure medium storage container and enables, in addition to rapid pressure medium drainage, particularly rapid lowering of the brake pressure of a wheel brake of the rear axle in the event of changing surrounding conditions.

To control the two pressure medium connections, the third actuator system has at least one electronically activatable directional control valve. Such directional control valves are also used in the primary actuator system to control the brake pressure in the particular wheel brakes of a vehicle braking system and are therefore available cost-effectively on the market in a sufficient quantity. A first directional control valve switchable by electronic activation is preferably used to control the first pressure medium connection and a correspondingly switchable second control valve is used to control the second pressure medium connection. This enables a high pressure setting accuracy using relatively simply constructed and accordingly cost-effective directional control valves. Two switchable directional control valves for controlling the two pressure medium connections may be controlled with low circuitry expenditure and enable maximum independence in the control of the two pressure medium connections.

An activation of the third actuator system is only necessary if a malfunction of the primary actuator system has been established and the brake pressure generated by the secondary actuator system is higher than the brake pressure convertible by the wheel brakes of the rear axle, i.e., if the wheel brakes of the rear axle tend toward uncontrolled locking because of the axle load displacement in the direction of the front axle as a result of the braking procedure. With activation of the third actuator system, the brake pressure at the wheel brakes of the rear axle is adaptable individually by wheel, so that the particular brake pressure is also convertible in its entirety into brake power by the particular wheel brakes, i.e., without uncontrolled locking of this wheel of the rear axle occurring.

The third actuator system may preferably be constructed separately from the primary actuator system and/or from the secondary actuator system on the basis of a separate actuator housing and use separate associated pressure-medium-controlling components. On the one hand, this has the advantage that components of the primary actuator system are not subjected to increased load for expanded functional protection of a vehicle braking system according to the present invention. Furthermore, the electronic control unit of the primary actuator system and/or the secondary actuator system may be combined with that of the third actuator system or control units that are structurally separate from one another may be used.

The present invention accordingly enables a high level of design freedom in the constructive implementation, with manageable costs and nonetheless compact construction at the same time, as well as simple integration capability of the third actuator system into an existing braking system.

BRIEF DESCRIPTION OF EXAMPLE EMBODIMENTS

An exemplary embodiment of the present invention is shown in the figures and is explained in greater detail below.

FIG. 1 shows, in schematically simplified form, an electronically slip-controllable braking system on which the present invention is based, including a first actuator system, a second actuator system, and a third actuator system for controlling and regulating the brake pressure in wheel brakes of a front axle and a rear axle of a vehicle.

Figure 2:
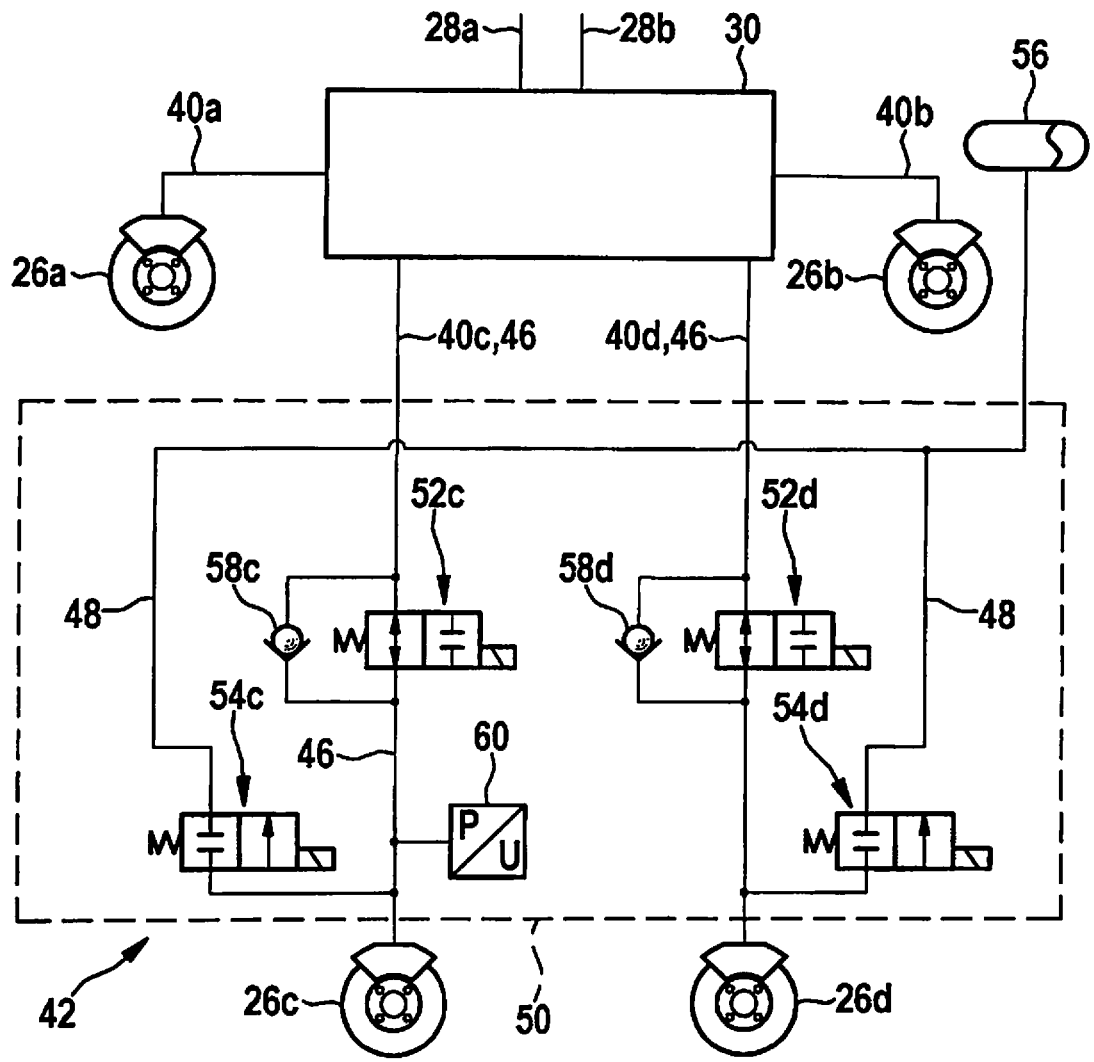

FIG. 2 additionally shows the structure according to the present invention of the third actuator system and its fluidic contacting with the remaining vehicle braking system.

DETAILED DESCRIPTION OF EXAMPLE EMBODIMENTS

Electronically slip-controllable braking system 10 according to FIG. 1 includes, inter alia, an actuating unit 14, which is actuatable by a driver by muscle strength via a pedal 12, for example, and a master brake cylinder 16, acted upon by this actuating unit 14, and which is supplied with pressure medium by a connected reservoir 18. Actuating unit 14 is equipped with an electronically activatable actuator 20, by which the brake force applied by the driver may be boosted via external force. This actuator 20 is, for example, an electronically activatable electric motor including a downstream gear unit. An electronic activation of the electric motor may take place as a function of the actuation of pedal 12 or independently of a pedal actuation. For the first mentioned case, pedal sensors 13 are provided, which detect the actuating force and/or the actuating travel and therefore a braking intention of a driver and whose sensor signals are evaluated by an electronic control unit 22 to compute the activation signals for the electric motor.

Electronically activatable brake booster or actuating unit 14 form, in operational connection to master brake cylinder 16 and control unit 22 within the vehicle braking system, a so-called second actuator system 24 or secondary actuator system. The latter is capable of applying a uniform brake pressure to wheel brakes 26a through 26d of braking system 10, this application taking place indirectly by way of a first actuator system 30 or primary actuator system situated downstream from second actuator system 24.

Master brake cylinder 16 supplies two brake circuits separate from one another with pressure medium and is connected for this purpose via two lines 28a, 28b, which are associated with the brake circuits, to mentioned first actuator system 30 or primary actuator system.

This primary actuator system 30 is the hydraulic assembly of a slip-controllable vehicle braking system well known from the related art, which is also known under the name ABS/ESP braking system. The total of four wheel brakes 26a through 26d are connected in a pressure-medium-conducting manner to this first actuator system or primary actuator system 30. Each two of these wheel brakes 26a, 26b are provided to decelerate wheels 34a, 34b of a front axle 36 or wheels 34c, 34d of a rear axle 38 of the vehicle.

Primary actuator system 30 is, in contrast to secondary actuator system 24, capable of supplying different brake pressures individually to various wheel brakes 26a through 26d of vehicle braking system 10. For this purpose, this primary actuator system 30 has, inter alia, a pressure generator unit drivable by an electric motor (not shown), and electronically activatable solenoid valves.

A modulation of the brake pressure by these components is carried out as a function of the slip conditions which prevail at affected wheel 34 and are detected by wheel sensors 35. Their measuring signals represent the particular wheel speeds and are supplied to electronic control unit 22 and further processed into activation signals for the pressure generator or regulating components of first actuator system 30.

Two brake lines 40c, 40d lead via a third actuator system 42 of vehicle braking system 10 to the two wheel brakes 26c, 26d of rear axle 38. This third actuator system 42 is accordingly situated downstream from primary actuator system 30 and upstream from wheel brakes 26c, 26d of rear axle 38. Primary actuator system 30, third actuator system 42, and wheel brakes 26c, 26d of rear axle 38 are accordingly connected in succession or in series.

In normal operation of vehicle braking system 10, the required brake pressure is provided by an adapted electronic activation of the second actuator system or secondary actuator system 24 as a function of an actuation of pedal 12 and possibly adapted by electronic activation of the first actuator system or primary actuator system 30 to the slip conditions prevailing at wheels 34a through 34d. The brake pressure buildup or the brake pressure modulation may be carried out with or without driver participation, for example, if the driving condition of the vehicle or the traffic conditions require it, or the vehicle is operated in an autonomous driving mode.

Despite all technical precautions, malfunctions in such an intended operation of vehicle braking system 10 are not to be precluded entirely. In case of an occurring malfunction at primary actuator system 30, secondary actuator system 24 is capable with the aid of its actuator 20 of independently building up a brake pressure, to finally decelerate the vehicle to a standstill. Primary actuator system 30 and secondary actuator system 24 are accordingly redundant to one another, so that a failure of first actuator system 30 is secured by provided second actuator system 24.

As explained above, third actuator system 42 is present to lower the brake pressure level at wheel brakes 26c, 26d of rear axle 38 in relation to the brake pressure level at wheel brakes 26a, 26b of front axle 36, if secondary actuator system 24 is active in case of fault of primary actuator system 30 and if the brake pressure provided by secondary actuator system 24 is not convertible in its entirety into brake power by wheel brakes 26c, 26d, i.e., if there is an impending risk of locking at wheels 34c, 34d of rear axle 38.

Third actuator system 42 is activated in this case by electronic control unit 22 in such a way that the brake pressure at wheel brakes 26c, 26d of rear axle 38 is adapted to a dynamic displacement of the axle load taking place during the braking procedure. Premature locking of wheel brakes 26c, 26d of rear axle 38 and an unstable driving condition of the vehicle which necessarily accompanies this are prevented by such an adaptation of the brake pressure. Furthermore, a lengthening of the vehicle braking distance is counteracted. In other words, third actuator system 42 reduces the brake pressure at wheel brakes 26c, 26d of rear axle 38 enough that wheels 34c, 34d associated with these wheel brakes 26c, 26d do not keep rolling or do not permanently lock in an uncontrolled manner.

The structure of this third actuator system 42 is illustrated in FIG. 2. Components of FIGS. 1 and 2 corresponding to one another are provided with uniform reference numerals in the following description.

FIG. 2 shows first actuator system 30, which is supplied with pressure medium under brake pressure via brake lines 28a, 28b, which are associated with the two brake circuits of braking system 10. A total of four wheel brakes 26a through 26d are connected to first actuator system 30 via brake lines 40a through 40d. It is to be presumed that wheel brakes 26a and 26b are located on front axle 36 (FIG. 1) of the vehicle, while wheel brakes 26c and 26d are situated on rear axle 38 (FIG. 1) of the vehicle. Third actuator system 42 is located between first actuator system 30 and wheel brakes 26c, 26d of rear axle 38. The third actuator system includes an actuator housing 50, which is designed separately from first actuator system 30 by way of example and is illustrated on the basis of a dashed outline, and which is contacted via pressure medium connections with brake lines 40c and 40d and with wheel brakes 26c and 26d of rear axle 38.

One pressure buildup valve 52c, 52d and one pressure reducing valve 54c, 54d are situated on actuator housing 50 per wheel brake 26c, 26d. Furthermore, a pressure medium storage container 56 is provided.

Furthermore, a pressure-actuated check valve 58c, 58d is connected in parallel to each pressure buildup valve 54c, 54d. This check valve 58c, 58d is situated in the pressure medium circuit in such a way that it blocks a through flow direction from first actuator system 30 to wheel brake 26c, 26d or unblocks the opposite direction thereto, i.e., from wheel brake 26c, 26d to first actuator system 30, if a correspondingly oriented pressure gradient is applied by wheel brake 26c, 26d in the direction of first actuator system 30. Finally, at least one pressure sensor 60 is also present, which measures the instantaneous brake pressure at one of the two wheel brakes 26c, 26d of the rear axle and supplies the corresponding measuring signal to electronic control unit 22.

As may be inferred from the symbolic illustration in FIG. 2, pressure buildup valves 52c, 52d are preferably electromagnetically actuatable directional control valves having precisely one inflow and one outflow, which are switchable into a blocking position by electronic activation of a valve actuator from a normal open base position, against a force of a restoring means. Pressure buildup valves 52c, 52d control the pressure medium passage of brake lines 40c, 40d and therefore indirectly a first pressure medium connection 46 from second actuator system 24 of braking system 10 to one of wheel brakes 26c, 26d on rear axle 38 of the vehicle.

The two pressure reducing valves 54c, 54d are also electromagnetically actuatable, but in contrast to explained pressure buildup valves 52c, 52d, they are switchable from a normal closed base position into a passage position against the force of a restoring means. In the passage position, associated wheel brakes 26c, 26d are each coupled via a second pressure medium connection 48 to a shared pressure medium storage container 56. Alternatively, a separate pressure medium storage container 56 could also be associated with each wheel brake 26c, 26d. The at least one pressure medium storage container 56 is suitable for accommodating or storing pressure medium under atmospheric pressure.

The provided third actuator system 42 is not active in malfunction-free normal operation of vehicle braking system 10, i.e., first actuator system 30 and second actuator system 24 have a pressure-medium-conducting connection to wheel brakes 26c, 26d of the rear axle. Third actuator system 42 is first also activated when a malfunction of primary actuator system 30 has been determined by electronic control unit 22 and in addition the brake pressure provided by secondary actuator system 24, as a result of the axle load displacement occurring during a braking procedure, also cannot be converted in its entirety into a brake power by wheel brakes 26c, 26d of rear axle 38. The latter is detectable by wheel sensors 35 by way of an occurring speed change of wheels 34a through d.

In the activated state, third actuator system 42 interrupts the pressure medium connection between first actuator 24 and wheel brakes 26c, 26d and thus prevents a further increase of the brake pressure at wheel brakes 26c, 26d of rear axle 38 up to the brake pressure level provided by second actuator system 24. For this purpose, third actuator system 42 blocks brake line 40c, 40d to wheel brakes 26c, 26d of rear axle 38 by electronic activation of pressure buildup valves 52c, 52d.

Notwithstanding this, in parallel thereto, a further pressure buildup may take place at wheel brakes 26a, 26b of front axle 36 via brake lines 40a, 40b, specifically until these wheel brakes 26a, 26b also reach their locking limit. However, the resulting brake pressure settable at wheel brakes 26a, 26b of front axle 36 is significantly higher than that at rear axle 38, since an additional load of front axle 36 is accompanied by a corresponding relief of rear axle 38 due to the dynamic axle load displacement.

If the slip conditions at wheels 34c, 34d of rear axle 38 change during a braking procedure controlled by secondary actuator system 24, i.e., in the event of malfunctioning operation of primary actuator system 30, in a direction which makes necessary a reduction of the set brake pressure, this is thus carried out with the aid of electronic activation of pressure reducing valves 54c, 54d of third actuator system 42 by control unit 22. Pressure reducing valves 54c, 54d thereupon switch into their passage position and release second pressure medium connection 48 between wheel brakes 26c, 26d and pressure medium storage container 56. Pressure medium drains out of wheel brakes 26c, 26d via this second pressure medium connection 48 on a direct path to pressure medium storage container 56, until the brake pressure in wheel brakes 26c, 26d is reduced to a lower pressure level, at which a permanent locking hazard of associated wheels 34c, 34d no longer threatens. If this state is achieved, the electronic activation of pressure reducing valves 54c, 54d is canceled, so that pressure reducing valves 54c, 54d are moved by their restoring element back into the base position again, in which second pressure medium connection 48 is interrupted.

Pressure medium storage container 56 at the end of second pressure medium connection 48 may be connected to reservoir 18 of braking system 10 or may alternatively also be identical to reservoir 18 of master brake cylinder 16. Pressure medium drained from wheel brakes 26c, 26d is thus available again to braking system 10 for a renewed brake pressure buildup or for brake force boosting immediately after a discharge from wheel brakes 26c, 26d.

Check valves 58c, 58d, which are connected in parallel to pressure buildup valves 52c, 52d, are also used for reducing the brake pressure in wheel brakes 26c, 26d of rear axle 38, but presume correct operation of primary actuator system 30. If such correct operation of primary actuator system 30 is present, the pressure medium may be actively conveyed from wheel brakes 26c, 26d by a pressure generator of primary actuator system 30 to reservoir 56 or 18. Check valves 58c, 58d open in a pressure-controlled manner and thus unblock a bypass around particular pressure buildup valve 52c, 52d. At least a large proportion of the quantity of pressure medium flowing back flows through check valves 58c, 58d and is not obstructed by the narrow through flow cross sections of pressure buildup valves 52c, 52d. The combination of open pressure reducing valves 52c, 52d and check valves 58c, 58d connected in parallel thereto accordingly ensures a preferably unthrottled drainage of the pressure medium from wheel brakes 26c, 26d or opposes the pressure medium flow that is flowing back with an extremely low flow resistance. A brake pressure adaptation accordingly takes place rapidly.

Of course, modifications or additions to the described exemplary embodiment are possible, without departing from the present invention.

It is to be noted in this regard that electronic control unit 22 which is mentioned in the description does not necessarily have to be designed as a single control unit, but rather may include multiple individual control units, each may be associated with one or multiple actuator systems 24, 30, 42. However, in particular for reasons of redundancy, at least two control units 22 which are electronically separate from one another are to be provided, of which a first controls first actuator system 30 and/or second actuator system 24, while a second control unit is provided to control third actuator system 42.

What is claimed is:

1. An electronically slip-controllable braking system for a motor vehicle, comprising:
    an actuatable master brake cylinder;
    an electronically activatable first actuator system;
    an electronically activatable second actuator system;
    a third actuator system; and
    at least one electronic control unit;
    wherein:
        the first, second, and third actuator systems are respectively activatable under control by the at least one electronic unit;
        the second actuator system is configured to control the master brake cylinder to apply a pressure medium uniformly towards wheel brakes of wheels of a front axle of the vehicle and wheel brakes of wheels of a rear axle of the vehicle;
        the first actuator system is configured to separately and non-uniformly regulate, based on respective slip conditions present at respective ones of the wheels of the front axle and wheels of the rear axle, a respective amount of the pressure medium, which is provided by the master brake cylinder under the control by the second actuator system, that is supplied to each one of the wheel brakes of the wheels of the front axle and wheel brakes of the wheels of the rear axle, so that, with respect to each one of the wheels of the front axle and wheels of the rear axle, the respective amount of the pressure medium supplied to the respective wheel brake of the respective wheel can differ from the respective amounts of the pressure medium supplied to the respective wheel brakes of each other one of the wheels of the front axle and wheels of the rear axle;
        the first and second actuator systems are arranged such that, if the first actuator system is in a failure state, the pressure medium provided by the master brake cylinder under the control by the second actuator system is uniformly distributed on respective lines from the master brake cylinder to respective ones of the wheel brakes of the wheels of the front axle and wheels of the rear axle; and
        the third actuator system is configured to perform a control responsive to the first actuator system being in the failure state, the control including:
            controlling a connection between the lines from the master brake cylinder to the respective wheel brakes of the wheels of the rear axle to cut off the supply of the pressure medium, which is from the master brake cylinder under the control of the second actuator system, to the wheel brakes of the wheels of the rear axle in response to occurrence of a predefined condition while the first actuator system is in the failure state, so that the pressure medium is supplied to the wheel brakes of the wheels of the front axle and not the wheel brakes of the wheels of the rear axle; and
            controlling a pressure medium connection between the wheel brakes of the wheels of the rear axle and a pressure medium storage container so that pressure medium at the wheel brakes of the wheels of the rear axle can be supplied back to the pressure storage container while the pressure medium, which is from the master brake cylinder under the control of the second actuator system, is supplied to the wheel brakes of the front wheels.

2. The electronically slip-controllable braking system as recited in claim 1, wherein the pressure medium connection connects the wheel brakes of the wheels of the rear axle directly to the pressure medium storage container.

3. The electronically slip-controllable braking system as recited in claim 1, wherein:
    the third actuator system is equipped with at least one electronically activatable directional control valve per wheel brake of the rear axle; and
    the at least one electronically activatable directional control valve is movable from a base position, in which a connection by which the wheel brakes of the wheels of the rear axle can be supplied the pressure medium from the master brake cylinder under the control by the second actuator system is open and the pressure medium connection between the wheel brakes of the wheels of the rear axle and the pressure storage container is closed, into at least one first switch position, in which the connection by which the wheel brakes of the wheels of the rear axle can be supplied the pressure medium from the master brake cylinder under the control by the second actuator system is blocked and the pressure medium connection between the wheel brakes of the wheels of the rear axle and the pressure storage container is open.

4. The electronically slip-controllable braking system as recited in claim 1, wherein the third actuator system includes at least one directional control valve via which the third actuator system is configured to simultaneously (a) perform the cut off of the supply of the pressure medium, which is from the master brake cylinder under the control of the second actuator system, to the wheel brakes of the wheels of the rear axle and (b) block the pressure medium connection between the wheel brakes of the wheels of the rear axle and the pressure medium storage container.

5. The electronically slip-controllable braking system as recited in claim 1, wherein:
    the third actuator system is equipped with two directional control valves, which are switchable by electronic activation, per wheel brake of the wheels of the rear axle;
    a first one of the directional control valves controls a connection by which the supply of the pressure medium, which is from the master brake cylinder under the control of the second actuator system, is connected to the wheel brakes of the wheels of the rear axle; and
    a second one of the directional control valves controls the pressure medium connection.

6. The electronically slip-controllable braking system as recited in claim 1, wherein the pressure medium storage container is one of: (i) connected in a pressure-medium-conducting manner to a reservoir associated with the master brake cylinder of the braking system, or (ii) is the reservoir associated with the master brake cylinder.

7. An electronically slip-controllable braking system for a motor vehicle, comprising:
- an actuatable master brake cylinder;
- an electronically activatable first actuator system;
- an electronically activatable second actuator system;
- a third actuator system; and
- at least one electronic control unit;

wherein:
- the first, second, and third actuator systems are respectively activatable under control by the at least one electronic unit;
- the second actuator system is configured to control the master brake cylinder to supply a pressure medium;
- the second actuator system and master brake cylinder are arranged so that whenever the master brake cylinder is controlled by the second actuator system to supply the pressure medium, the master brake cylinder supplies the pressure medium to the first actuator system for distribution by the first actuator system between wheel brakes of wheels of a front axle of the vehicle and wheel brakes of wheels of a rear axle of the vehicle;
- the first actuator system is configured to separately and non-uniformly regulate, based on respective slip conditions present at respective ones of the wheels of the front axle and wheels of the rear axle, a respective amount of the pressure medium, which is supplied by the master brake cylinder to the second actuator system under the control by the second actuator system, that is supplied to each one of the wheel brakes of the wheels of the front axle and wheel brakes of the wheels of the rear axle, so that, with respect to each one of the wheels of the front axle and wheels of the rear axle, the respective amount of the pressure medium supplied to the respective wheel brake of the respective wheel can differ from the respective amounts of the pressure medium supplied to the respective wheel brakes of each other one of the wheels of the front axle and wheels of the rear axle;
- the first actuator system is configured so that the regulation of the respective amounts of the pressure medium supplied to the respective wheel brakes includes providing the respective amounts on respective supply lines from the first actuator system to the respective wheel brakes, the supply lines to the wheel brakes of the wheels of the rear axle extending from the first actuator system to the wheel brakes of the wheels of the rear axle via the third actuator system, so that with respect to a flow direction of the pressure medium from the master brake cylinder to the wheel brakes of the wheels of the rear axle, the third actuator system is downstream of the first actuator system and upstream of the wheel brakes of the wheels of the rear axle;
- the first and second actuator systems are arranged such that, if the first actuator system is in a failure state, the pressure medium provided by the master brake cylinder under the control by the second actuator system is uniformly distributed from the second actuator system onto the respective lines to the respective wheel brakes of the wheels of the front axle and the wheels of the rear axle; and
- the braking system is arranged such that, if there is occurrence of the failure state of the first actuator system, then, responsive to the failure state, the third actuator system:
  - controls a connection between the lines from the first actuator system to the respective wheel brakes of the wheels of the rear axle to cut off the supply of the pressure medium from the first actuator system, which is from the master brake cylinder under the control of the second actuator system, to the wheel brakes of the wheels of the rear axle in response to occurrence of a predefined condition while the first actuator system is in the failure state, so that the pressure medium is supplied to the wheel brakes of the wheels of the front axle and not to the wheel brakes of the wheels of the rear axle; and
  - controls a pressure medium connection between the wheel brakes of the wheels of the rear axle and a pressure medium storage container so that pressure medium at the wheel brakes of the wheels of the rear axle can be supplied back to the pressure storage container while the pressure medium, which is supplied to the first actuator system from the master brake cylinder under the control of the second actuator system, is supplied to the wheel brakes of the front wheels.

8. The electronically slip-controllable braking system as recited in claim 7, wherein the supply lines from the first actuator system to the wheel brakes of the wheels of the front axle extend from the first actuator system to the wheel brakes of the wheels of the front axle without passing through the third actuator system, so that the pressure medium is suppliable to the wheel brakes of the wheels of the front axle bypassing the third actuator system.

9. The electronically slip-controllable braking system as recited in claim 8, wherein the pressure medium is suppliable from the first actuator system to the wheel brakes of the wheels of the rear axle only via the third actuator system downstream of the first actuator system.

10. The electronically slip-controllable braking system as recited in claim 7, wherein the pressure medium connection connects the wheel brakes of the wheels of the rear axle directly to the pressure medium storage container.

11. The electronically slip-controllable braking system as recited in claim 7, wherein:
- the third actuator system is equipped with at least one electronically activatable directional control valve per wheel brake of the rear axle; and
- the at least one electronically activatable directional control valve is movable from a base position, in which a connection by which the wheel brakes of the wheels of the rear axle can be supplied the pressure medium from the master brake cylinder under the control by the second actuator system is open and the pressure medium connection between the wheel brakes of the wheels of the rear axle and the pressure storage container is closed, into at least one first switch position, in which the connection by which the wheel brakes of the wheels of the rear axle can be supplied the pressure medium from the master brake cylinder under the control by the second actuator system is blocked and the pressure medium connection between the wheel brakes of the wheels of the rear axle and the pressure storage container is open.

12. The electronically slip-controllable braking system as recited in claim 7, wherein the third actuator system includes at least one directional control valve via which the third actuator system is configured to simultaneously (a) perform the cut off of the supply of the pressure medium, which is from the master brake cylinder under the control of the second actuator system, to the wheel brakes of the wheels of the rear axle and (b) block the pressure medium connection between the wheel brakes of the wheels of the rear axle and the pressure medium storage container.

13. The electronically slip-controllable braking system as recited in claim 7, wherein:
   the third actuator system is equipped with two directional control valves, which are switchable by electronic activation, per wheel brake of the wheels of the rear axle;
   a first one of the directional control valves controls a connection by which the supply of the pressure medium, which is from the master brake cylinder under the control of the second actuator system, is connected to the wheel brakes of the wheels of the rear axle; and
   a second one of the directional control valves controls the pressure medium connection.

14. The electronically slip-controllable braking system as recited in claim 7, wherein the pressure medium storage container is one of: (i) connected in a pressure-medium-conducting manner to a reservoir associated with the master brake cylinder of the braking system, or (ii) is the reservoir associated with the master brake cylinder.

\* \* \* \* \*